(12) United States Patent
Radzyuk (10) Patent No.: US 10,711,943 B2
(45) Date of Patent: Jul. 14, 2020

(54) DIAPHRAGM SEAL INJECTOR

(71) Applicant: Graco Minnesota Inc., Minneapolis, MN (US)

(72) Inventor: Igor V. Radzyuk, Ramsey, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 291 days.

(21) Appl. No.: 15/568,313

(22) PCT Filed: Apr. 29, 2016

(86) PCT No.: PCT/US2016/030143
§ 371 (c)(1),
(2) Date: Oct. 20, 2017

(87) PCT Pub. No.: WO2016/176586
PCT Pub. Date: Nov. 3, 2016

(65) Prior Publication Data
US 2018/0149310 A1 May 31, 2018

Related U.S. Application Data

(60) Provisional application No. 62/154,204, filed on Apr. 29, 2015.

(51) Int. Cl.
*F16N 27/00* (2006.01)
*F01M 1/08* (2006.01)
(Continued)

(52) U.S. Cl.
CPC .............. *F16N 27/00* (2013.01); *F01M 1/08* (2013.01); *F16N 7/38* (2013.01); *F16N 25/02* (2013.01); *F16N 29/00* (2013.01); *F16N 2270/32* (2013.01)

(58) Field of Classification Search
CPC ........ F16N 27/00; F16N 2270/32; F01M 1/08
See application file for complete search history.

(56) References Cited

U.S. PATENT DOCUMENTS

| | | | | |
|---|---|---|---|---|
| 1,942,096 A | * | 1/1934 | Hallerberg | F16N 27/00 184/7.4 |
| 2,122,177 A | * | 6/1938 | Klein | F16N 27/00 184/7.4 |

(Continued)

FOREIGN PATENT DOCUMENTS

| | | |
|---|---|---|
| CH | 96040 A | 9/1922 |
| CN | 2301598 Y | 12/1998 |

(Continued)

OTHER PUBLICATIONS

CN202561412—Machine Translation (Year: 2012).*
(Continued)

*Primary Examiner* — Michael A Riegelman
(74) *Attorney, Agent, or Firm* — Kinney & Lange, P. A.

(57) ABSTRACT

A lubricant injector includes a housing and a metering section attached to the housing. The housing includes a body and a metering cylinder extending from the body. The metering section includes a diaphragm disposed within the metering cylinder. The diaphragm forms a static seal between the metering cylinder and a lubricant pathway that extends through the body, and the diaphragm defines a metering chamber for measuring a volume of lubricant to be applied during a lubrication cycle. A retaining member secures the diaphragm within the metering cylinder.

22 Claims, 5 Drawing Sheets

(51) Int. Cl.
*F16N 7/38* (2006.01)
*F16N 29/00* (2006.01)
*F16N 25/02* (2006.01)

(56) References Cited

U.S. PATENT DOCUMENTS

| | | | | |
|---|---|---|---|---|
| 2,155,250 A | * | 4/1939 | Barks | F16N 27/00 |
| | | | | 184/7.4 |
| 2,637,413 A | * | 5/1953 | Fox | F16N 27/00 |
| | | | | 184/7.4 |
| 2,752,006 A | * | 6/1956 | Le Clair | F16N 27/005 |
| | | | | 184/7.3 |
| 2,905,270 A | * | 9/1959 | Jackson | F16N 27/00 |
| | | | | 184/7.4 |
| 3,013,633 A | * | 12/1961 | Rotter | F16N 27/00 |
| | | | | 184/7.4 |
| 3,119,463 A | * | 1/1964 | Jackson | F16N 27/00 |
| | | | | 184/7.4 |
| 3,209,721 A | * | 10/1965 | Pall | B01D 35/143 |
| | | | | 116/267 |
| 3,492,968 A | * | 2/1970 | Workman, Jr. | G01L 19/12 |
| | | | | 116/270 |
| 3,609,066 A | * | 9/1971 | Wegmann | F04B 7/04 |
| | | | | 417/344 |
| 3,664,462 A | * | 5/1972 | Smith, Sr. | F16N 13/02 |
| | | | | 184/7.4 |
| 3,703,879 A | * | 11/1972 | Huthsing, Jr. | G01L 7/086 |
| | | | | 116/270 |
| 3,715,013 A | * | 2/1973 | Lyth | F16N 27/00 |
| | | | | 184/7.4 |
| 3,958,725 A | * | 5/1976 | Reeve | F16N 27/00 |
| | | | | 222/335 |
| 3,995,717 A | * | 12/1976 | Kroffke | F16N 7/385 |
| | | | | 184/7.4 |
| 4,369,728 A | * | 1/1983 | Nelson | B01D 46/0086 |
| | | | | 116/276 |
| 4,375,246 A | * | 3/1983 | Tietje | F16N 11/04 |
| | | | | 184/45.1 |
| 4,465,013 A | * | 8/1984 | Malec | B60C 23/007 |
| | | | | 116/271 |
| 4,620,500 A | * | 11/1986 | Condon | G01L 19/12 |
| | | | | 116/215 |
| 4,829,820 A | * | 5/1989 | Johnson | G01F 23/161 |
| | | | | 116/227 |
| 5,189,979 A | * | 3/1993 | Popenoe | G01L 19/12 |
| | | | | 116/273 |
| 6,808,048 B2 | * | 10/2004 | Clancy | F16N 25/02 |
| | | | | 184/50.1 |
| 7,360,433 B2 | * | 4/2008 | Janik | B01D 35/143 |
| | | | | 116/268 |
| 2004/0159497 A1 | * | 8/2004 | Conley | F16N 25/02 |
| | | | | 184/7.4 |
| 2015/0129362 A1 | * | 5/2015 | Clark | F16N 25/00 |
| | | | | 184/7.4 |
| 2015/0377115 A1 | * | 12/2015 | Shinagawa | F02P 5/152 |
| | | | | 123/41.15 |
| 2018/0135801 A1 | * | 5/2018 | Paar | H02N 2/183 |
| 2018/0149310 A1 | * | 5/2018 | Radzyuk | F01M 1/08 |

FOREIGN PATENT DOCUMENTS

| | | |
|---|---|---|
| CN | 202561412 U | 11/2012 |
| EP | 0981008 A1 | 2/2000 |
| JP | 05-083597 U | 11/1993 |
| JP | H0583597 U | 11/1993 |
| JP | 2013139745 A | 7/2013 |

OTHER PUBLICATIONS

Communication Pursuant to Article 94(3) EPC for EP Application No. 16787240.7, dated Jun. 24, 2019, pp. 4.
Second Chinese Office Action for CN Application No. 201680024617.4, dated Jun. 26, 2019, pp. 20.
Extended European Search Report for EP Application No. 16787240.7, dated Nov. 21, 2018, pp. 8.
International Search Report and Written Opinion for PCT Application No. PCT/US2016/030143, dated Aug. 16, 2016, 13 pages.
First Office Action for Chinese Application No. 201680024617.4, dated Oct. 8, 2018, 8 pages.
Australian Exam Report for AU Application No. 2016255520, dated Sep. 5, 2019, pp. 3.
Third Chinese Office Action for CN Application No. 201680024617.4, dated Oct. 8, 2019, pp. 20.
Communication Pursuant to Article 94(3) EPC for EP Application No. 16787240.7, dated Feb. 13, 2020, pp. 3.

* cited by examiner

DIAPHRAGM SEAL INJECTOR

CROSS-REFERENCE TO RELATED APPLICATION

This application claims priority to U.S. Provisional Application No. 62/154,204 filed on Apr. 29, 2015, and entitled "DIAPHRAGM SEAL INJECTOR," the disclosure of which is incorporated by reference in its entirety.

BACKGROUND

Machinery often requires lubrication to function. Seals, pistons, bearings, and other parts require lubrication with small, measured amounts of grease or oil over short, frequent time intervals to prevent wear, corrosion, over-lubrication, or under-lubrication. Lubricant fluid is injected at specific locations that require lubrication by lubricant injectors. Lubricant fluid is drawn from a lubricant reservoir and pumped to the lubricant injectors via a lubrication line. The lubricant injectors are configured to fire and inject a set, small amount of lubricant fluid to the specific location within the machinery once the pressure within the lubrication line reaches a predetermined level. When the lubricant injectors fire, the lubricant injectors are simultaneously reloaded with reloaded with lubricant for the next lubrication cycle. After the lubricant injectors have fired, the pressure within the lubrication line is relieved, thereby resetting the lubricant system for another lubrication cycle.

SUMMARY

According to one embodiment, a lubricant injector includes a housing, a inlet cylinder, a lubricant chamber, a metering chamber, a firing mechanism, and a metering portion. The housing includes a body and a metering cylinder extending from the body. The inlet cylinder is attached to the body of the housing and defines a pressure chamber. The lubricant chamber is disposed within the body and connected to the pressure chamber. The metering chamber is connected to the lubricant chamber. The firing mechanism is disposed within the inlet cylinder and extends into the lubricant chamber. The firing mechanism is movable between a first position, where the metering chamber is fluidly isolated from the pressure chamber, and a second position, where the metering chamber is fluidly connected to the pressure chamber. The metering portion is secured to the housing and includes a diaphragm disposed within the metering cylinder and forming a static seal about the metering chamber, and a retaining member having a first end and a second end. The second end is attached to the metering cylinder and the retaining member secures the diaphragm within the metering cylinder. The diaphragm is configured to flex to expand the metering chamber in response to a flow of lubricant to the metering chamber when the firing mechanism is in the second position.

According to another embodiment, a metering portion for a lubricant injector includes a diaphragm disposed within a metering cylinder, a retaining member attached to the metering cylinder and securing the diaphragm within the metering cylinder, and a pin extending disposed within the metering cylinder. The diaphragm forms a static seal to define a metering chamber, and the diaphragm is configured to flex in response to a flow of lubricant to the metering chamber to expand the metering chamber and measure a volume of lubricant. A metering end of the pin abuts the diaphragm.

DETAILED DESCRIPTION

Figure 1:
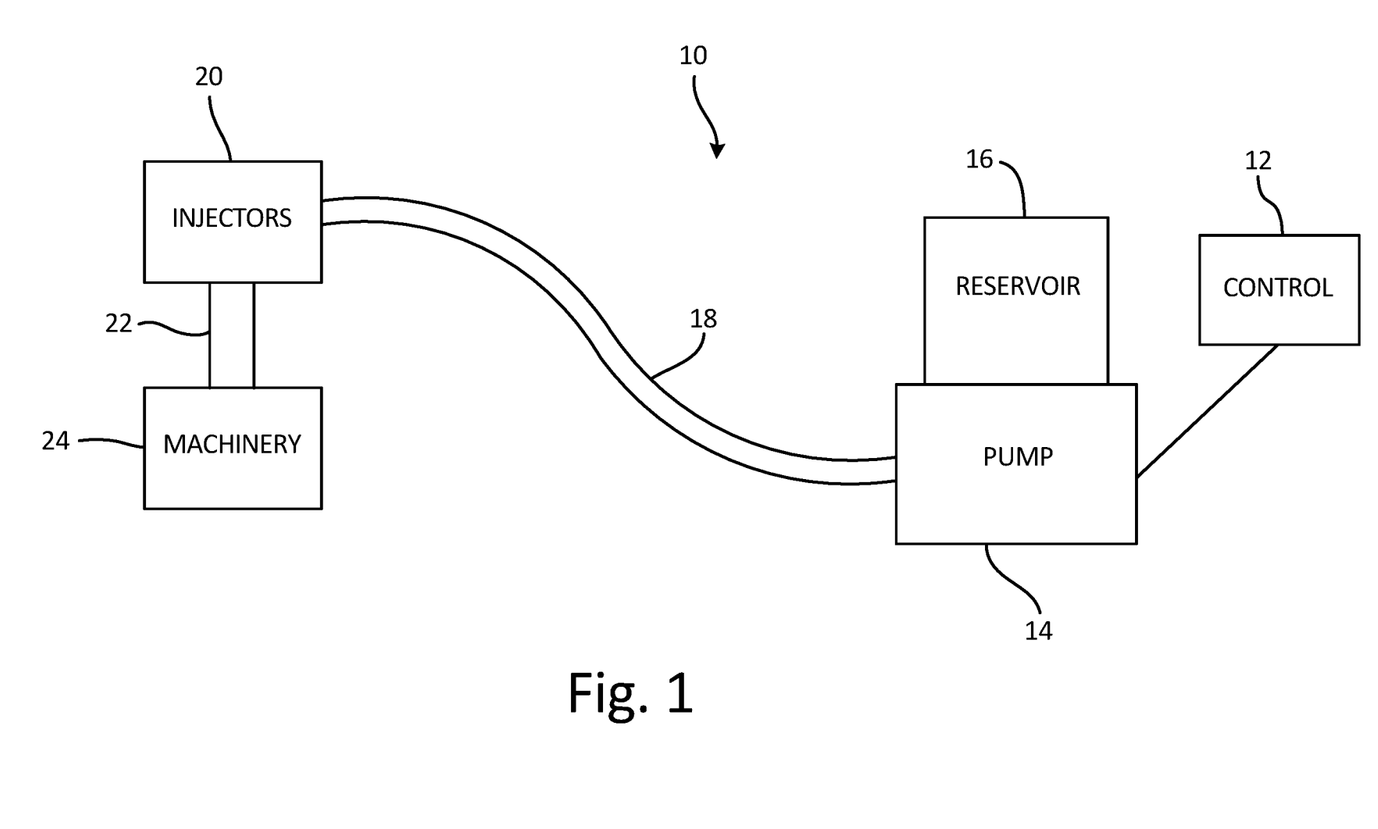
FIG. 1 is a schematic diagram of a lubrication system.

FIG. 1 is a schematic diagram of lubrication system 10, a system that receives, stores, and supplies lubricant to machinery. Lubrication system 10 includes control 12, pump 14, reservoir 16, lubrication line 18, lubricant injectors 20, supply line 22, and machinery 24. Control 12 is connected to pump 14. Pump 14 is connected to reservoir 16 to receive lubricant from reservoir 16. Lubrication line 18 extends from pump 14 and is connected to lubricant injectors 20. Supply line 22 extend from lubricant injectors 20 and are connected to machinery 24.

Lubrication system 10 is a dedicated lubrication assembly for use with lubricated machinery 24 such as pumps, pistons, seals, bearings, and/or shafts. Reservoir 16 stores lubricant for distribution to lubricant injectors 20, and lubricant injectors 20 provide set amounts of lubricant to machinery 24 at specific locations. Control 12 activates pump 14 to draw lubricant from reservoir 16 and drive the lubricant downstream through lubrication line 18. Each lubricant injector 20 is configured to dispense lubricant when the lubricant pressure in lubrication line 18 has reached a predetermined level. When the lubricant pressure reaches the predetermined level, the lubricant injector 20 is triggered and dispenses a set volume of lubricant to machinery 24 through supply line 22. After lubricant injector 20 has fired, lubricant injector 20 meters a set volume of lubricant for application during the next lubrication cycle. Once all lubricant injectors 20 have fired, the lubricant is vented from lubrication line 18 and back to pump 14 or reservoir 16, thereby reducing the lubricant pressure in lubrication line 18. Reducing the pressure in lubrication line 18 allows lubricant injectors 20 to reset for another lubrication cycle.

Figure 2:
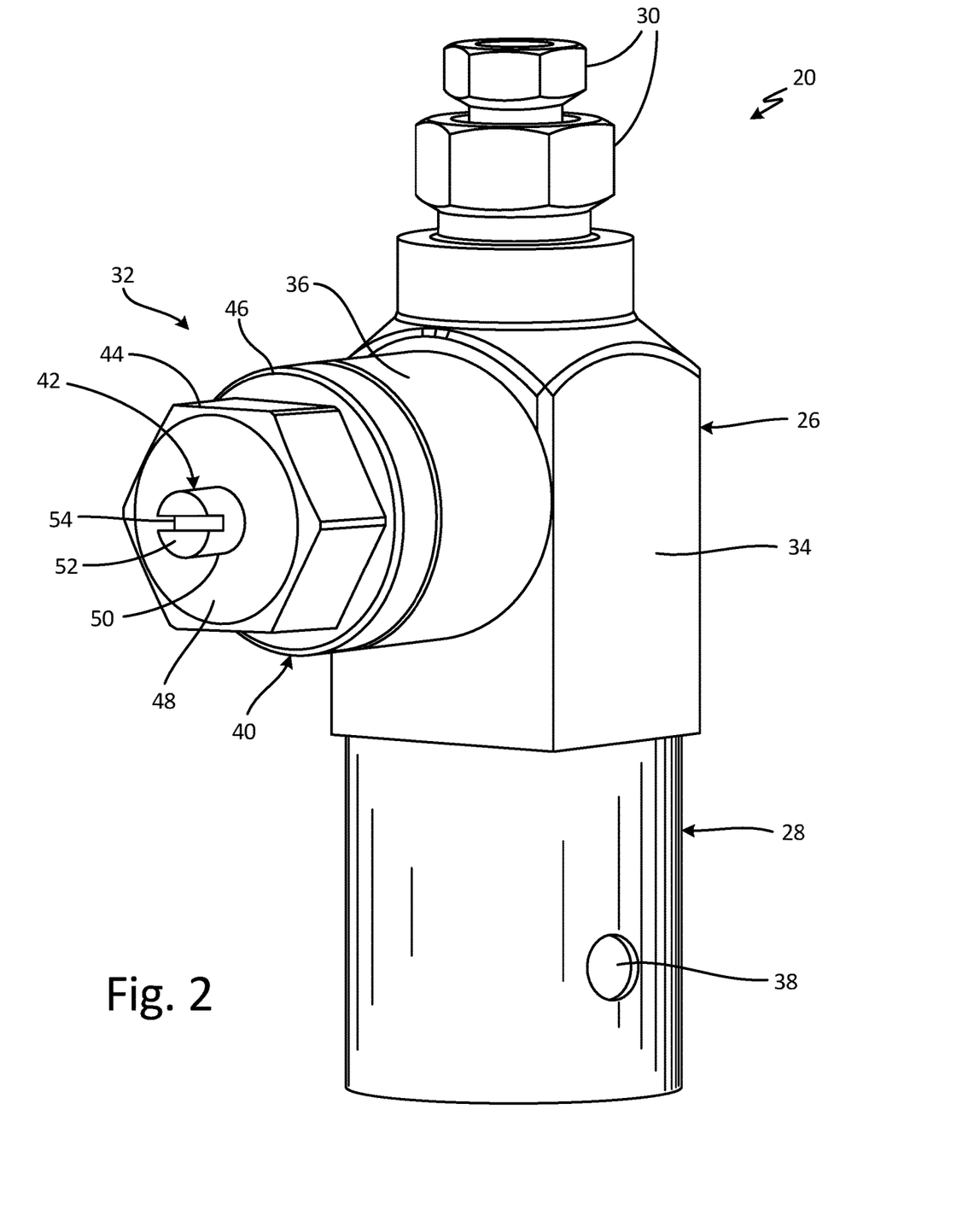
FIG. 2 is an isometric view of a lubricant injector.

FIG. 2 is a perspective view of lubricant injector 20. Lubricant injector 20 includes housing 26, inlet cylinder 28, outlet couplings 30, and metering portion 32. Housing 26 includes body 34 and metering cylinder 36. Inlet cylinder 28 includes lubricant inlet 38. Metering portion 32 includes retaining member 40 and pin 42. Retaining member 40 includes first end 44 and flange 46. First end 44 includes end wall 48 and aperture 50. Pin 42 includes indicating end 52, and indicating end 52 includes adjustment slot 54.

Inlet cylinder 28 is attached to body 34 of housing 26. Inlet cylinder 28 is configured to receive lubricant from lubrication line 18 (shown in FIG. 1) and provide the lubricant to housing 26. Lubricant inlet 38 extends into inlet cylinder 28. Lubrication line 18 provides lubricant to inlet cylinder 28 through lubricant inlet 38. Outlet couplings 30 are attached to body 34 of housing 26 opposite inlet cylinder 28. Outlet couplings 30 connect lubricant injector 20 to supply line 22 (shown in FIG. 1). Outlet couplings 30 are of varying sizes and are configured to connect to various sizes of supply line 22, thereby allowing lubricant injector 20 to supply lubricant across a variety of applications, regardless of the size of supply line 22.

Metering cylinder 36 extends from body 34, and metering portion 32 is partially disposed within metering cylinder 36. Retaining member 40 is attached to metering cylinder 36 with flange 46 abutting an end of metering cylinder 36. Flange 46 abutting an end of metering cylinder 36 indicates that retaining member 40 is fully installed and prevents overtightening of retaining member 40. Aperture 50 extends through end wall 48. Pin 42 is disposed within retaining member 40. Indicating end 52 of pin 42 extends through aperture 50 of retaining member 40. Adjustment slot 54 extends into indicating end 52 of pin 42.

Lubricant is provided to lubricant injector 20 by lubrication line 18, and the lubricant enters inlet cylinder 28 through lubricant inlet 38. Lubricant pressure builds within inlet cylinder 28 until the lubricant pressure reaches a predetermined level. Once the lubricant pressure reaches the predetermined level, the lubricant pressure causes internal components to shift within inlet cylinder 28 and housing 26. A premeasured portion of lubricant is dispensed from housing 26, through outlet couplings 30, and downstream to the machinery through supply line 22. Pin 42 shifts within retaining member 40 such that indicating end 52 of pin 42 projects from aperture 50. Indicating end 52 of pin 42 projecting from aperture 50 provides a visual indication to an observer that lubricant injector 20 has dispensed lubricant to the machinery.

After the lubricant injector 20 has dispensed lubricant, the lubricant is vented from lubrication line 18, thereby dropping the lubricant pressure within lubrication line 18 and lubricant injector 20. Relieving the lubricant pressure allows lubricant injector 20 to reset for another lubrication cycle. Pin 42 shifts back to the primed position and indicating end 52 retracts from the deployed position to the primed position. Similar to visually indicating that lubricant injector 20 has fired, pin 42 visually indicates that lubricant injector 20 has reset for the next lubrication cycle when indicating end 52 retracts from the deployed position.

Figure 3A:
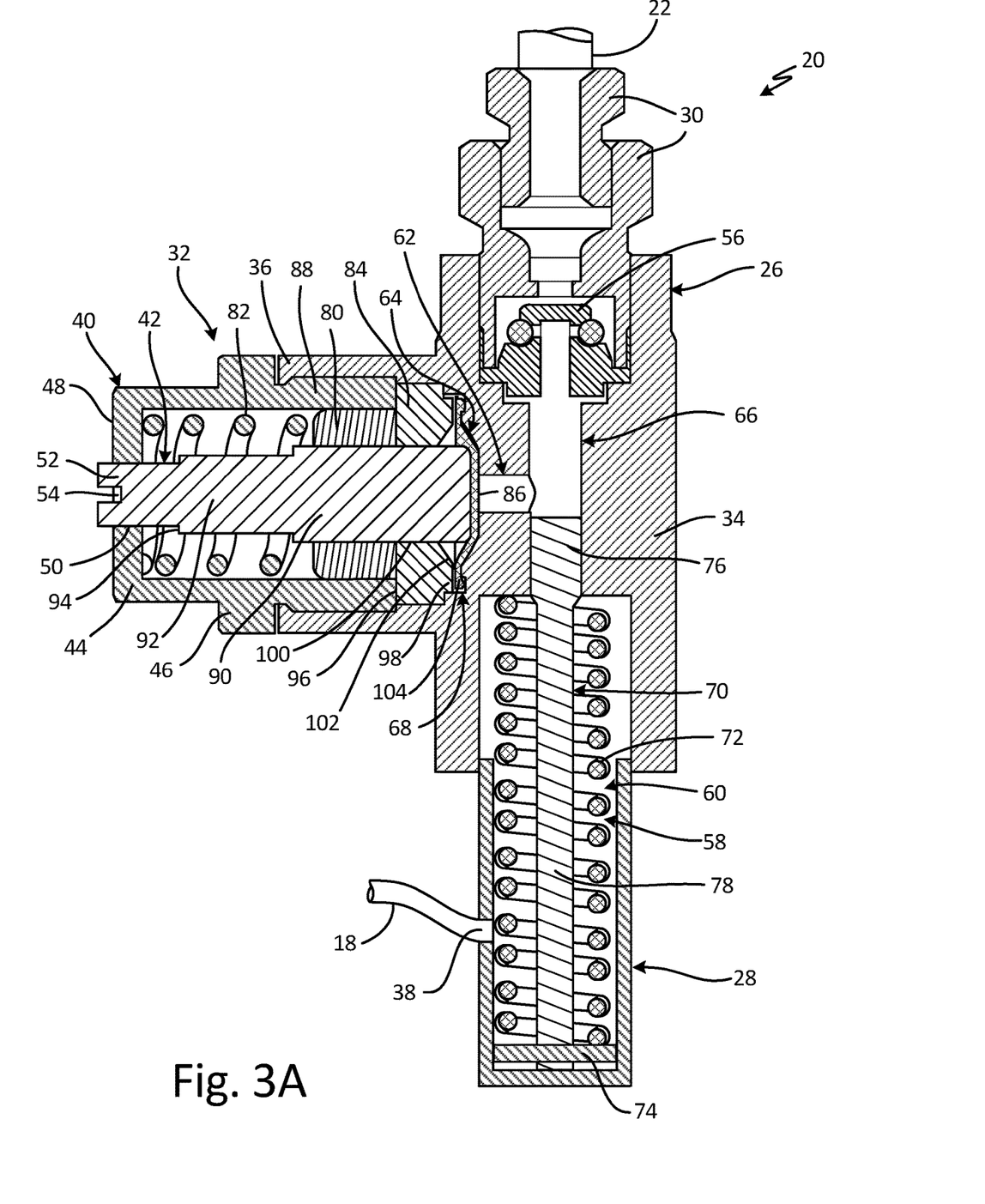
FIG. 3A is a cross-sectional view of a lubricant injector in a primed state.
Figure 3B:
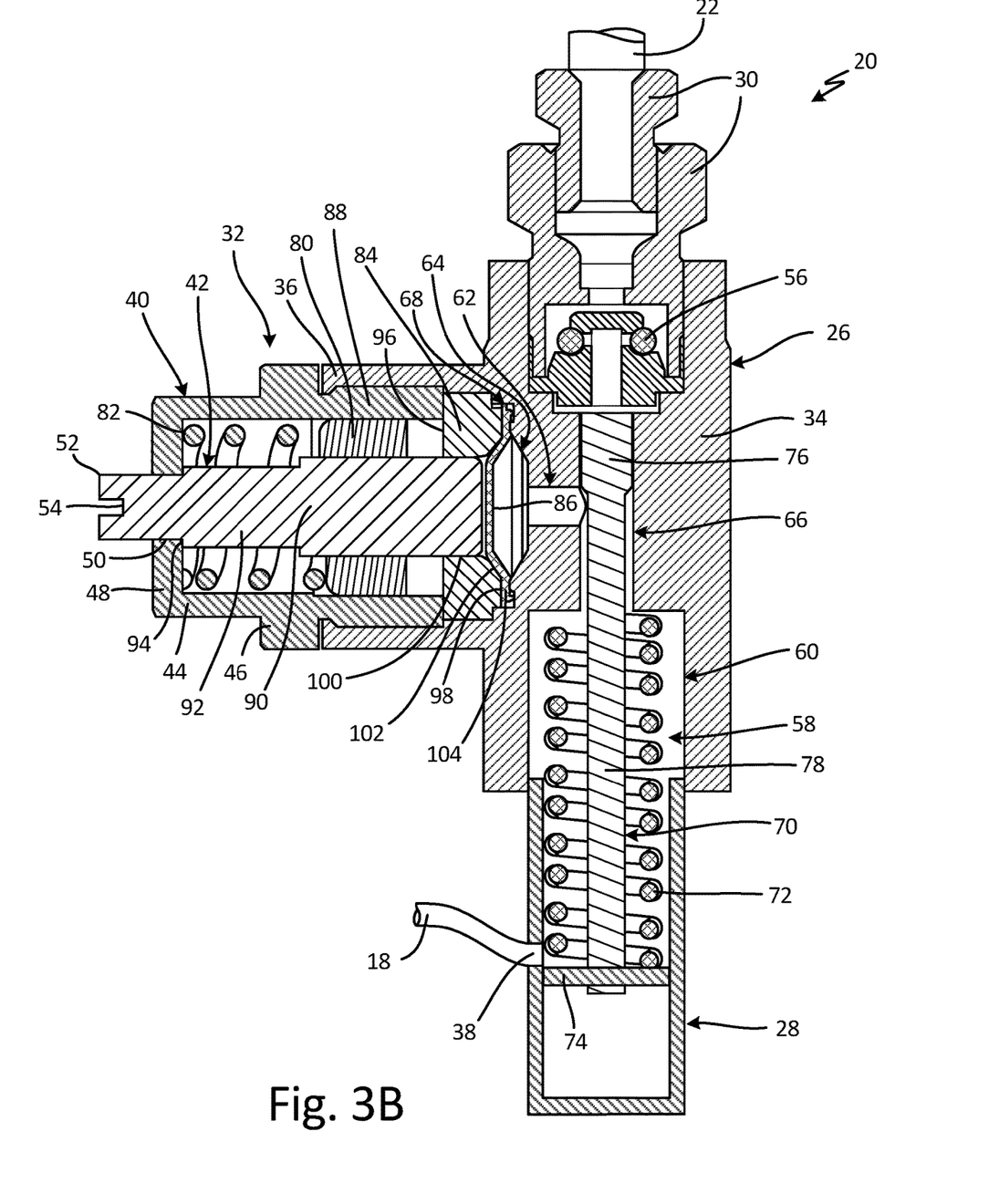
FIG. 3B is a cross-sectional view of a lubricant injector in an activated state.

FIG. 3A is a cross-sectional view of lubricant injector 20 in a primed state. FIG. 3B is a cross-sectional view of lubricant injector 20 in an activated state. FIGS. 3A and 3B are substantially similar and will be discussed together. Lubricant injector 20 includes housing 26, inlet cylinder 28, outlet couplings 30, metering portion 32, check valve 56, firing mechanism 58, and pressure chamber 60. Housing 26 includes body 34 and metering cylinder 36. Body 34 includes flow path 62, metering chamber 64, and lubricant chamber 66. Metering cylinder 36 includes annular recess 68. Inlet cylinder 28 includes lubricant inlet 38. Firing mechanism 58 includes piston 70, injector spring 72, and retaining clip 74. Piston 70 includes piston head 76 and shaft 78. Metering portion 32 includes retaining member 40, pin 42, lock nut 80, metering spring 82, backing plate 84, and diaphragm 86. Retaining member 40 includes first end 44, flange 46, and second end 88. First end 44 includes end wall 48 and aperture 50. Pin 42 includes indicating end 52, metering end 90, pin body 92, and shoulder 94. Indicating end 52 includes adjustment slot 54. Backing plate 84 includes first side 96, second side 98, and plate aperture 100. Second side 98 includes contour 102. Diaphragm 86 includes sealing ring 104.

Inlet cylinder 28 is secured to body 34 of housing 26. Inlet cylinder 28 and body 34 define pressure chamber 60. Lubricant inlet 38 extends through inlet cylinder 28 and into pressure chamber 60. Outlet couplings 30 are secured to body 34 of housing 26 opposite inlet cylinder 28. Outlet couplings 30 may be of various sizes to allow lubricant injector 20 to provide lubricant to supply line 22 of varying sizes. As such, outlet couplings 30 allow lubricant injector 20 to provide lubricant to the machinery, regardless of the size of supply line 22 utilized. Check valve 56 is disposed within body 34 between outlet couplings 30 and lubricant chamber 66. While lubricant injector 20 is described as including outlet couplings 30, it is understood that outlet couplings 30 allow lubricant injector 20 to be connected to various sizes of supply line 22, and as such, lubricant injector 20 may include no outlet couplings 30, where supply line 22 fits directly to housing 26, or may include one or more outlet couplings 30 to allow the same lubricant injector 20 to provide lubricant across a variety of systems, regardless of the size of supply line 22.

Metering cylinder 36 extends perpendicularly from body 34 of housing 26. Lubricant chamber 66 is disposed within body 34 and is configured to store a set volume of lubricant to be applied when lubricant injector 20 is fired. Flow path 62 extends between lubricant chamber 66 and metering cylinder 36. Metering chamber 64 (best seen in FIG. 3B) is disposed within metering cylinder 36 between flow path 62 and diaphragm 86, and metering chamber 64 is at least partially defined by diaphragm 86.

Firing mechanism 58 is disposed within pressure chamber 60 and is configured to force lubricant out of lubricant chamber 66, through check valve 56, and to supply line 22. Piston 70 is disposed within pressure chamber 60 and extends into lubricant chamber 66. Piston head 76 is slidably disposed within lubricant chamber 66 and tightly toleranced to lubricant chamber 66 to prevent lubricant from flowing around piston head 76 between lubricant chamber 66 and pressure chamber 60. Shaft 78 extends from piston head 76, through pressure chamber 60, and to retaining clip 74. Retaining clip 74 is secured to an end of shaft 78 disposed opposite piston head 76. Injector spring 72 is disposed around shaft 78 and extends between body 34 and retaining clip 74.

Metering portion 32 is received by and secured to metering cylinder 36. Diaphragm 86 is disposed within metering cylinder 36 with sealing ring 104 disposed within annular recess 68. Diaphragm 86 is disposed at an end of flow path 62 and diaphragm 86 provides a static seal between metering portion 32 and the lubricant. Backing plate 84 is disposed within metering cylinder 36 adjacent to diaphragm 86 and is disposed on an opposite side of diaphragm 86 from metering chamber 64. Second end 88 of retaining member 40 extends into metering cylinder 36 and is configured to force backing plate 84 against diaphragm 86. In this way, backing plate 84 secures sealing ring 104 of diaphragm 86 within annular recess 68. Forcing sealing ring 104 into annular recess 68 creates the static seal of metering chamber 64.

Second end 88 preferably includes external threading to mate with internal threading within metering cylinder 36. As such, retaining member 40 may be screwed into metering cylinder 36 to force backing plate 84 against diaphragm 86. While retaining member 40 forces backing plate 84 onto diaphragm 86, it is understood that second end 88 of retaining member 40 may extend fully into metering cylinder 36, such that second end 88 directly contacts diaphragm 86 to force sealing ring 104 into annular recess 68. As such, second end 88 may include a second end wall with a second aperture through which metering end 90 of pin 42 may extend before contacting diaphragm 86. The second end wall may include a contour similar to contour 102 to allow diaphragm 86 to conform to the contour on the second end wall when in the activated position (shown in FIG. 3B).

Lock nut 80 is slidably disposed within retaining member 40. Metering end 90 of pin 42 is attached to and extends through lock nut 80. An outer diameter of metering end 90 preferably includes external threading configured to mate with internal threading on lock nut 80. Metering end 90 also extends through plate aperture 100, and a distal end of metering end 90 abuts diaphragm 86. Pin body 92 extends between and connects metering end 90 and indicating end 52. Shoulder 94 is disposed at a connection of indicating end 52 and pin body 92. Indicating end 52 extends through aperture 50 in end wall 48. Metering spring 82 is disposed within retaining member 40 between lock nut 80 and end wall 48, and metering spring 82 biases lock nut 80 away from end wall 48.

Lock nut 80 defines the stoke length of pin 42, thereby determining the volume of lubricant metered for each lubrication cycle. The position of lock nut 80 on metering end 90 of pin 42 is adjustable to control the volume of lubricant dispensed. Lock nut 80 is slidably disposed within second end 88, but second end 88 prevents lock nut 80 from rotating relative to second end 88. Pin 42 may be rotated by a tool engaging adjustment slot 54 in indicating end 52 of pin 42. As such, rotating pin 42 causes lock nut 80 to shift along a length of metering end 90 due to the threaded connection of metering end 90 and lock nut 80, and due to lock nut 80 being non-rotatably disposed within second end 88. Rotating pin 42 to adjust the position of lock nut 80 on metering end 90 affects the distance that pin 42 extends through plate aperture 100 and thus how far into metering chamber 64 diaphragm 86 extends when in the primed position.

In FIG. 3A, lubricant injector 20 is shown in a primed state wherein a set volume of lubricant is loaded in lubricant chamber 66 for application. Piston head 76 is disposed within lubricant chamber 66 below flow path 62, and piston head 76 is tightly toleranced to lubricant chamber 66 such that piston head 76 prevents lubricant from flowing between lubricant chamber 66 and pressure chamber 60.

Injector spring 72 is configured to maintain piston 70 in the position shown in FIG. 3A. Injector spring 72 acts on retaining clip 74 to force piston 70 downward to the primed position. Metering spring 82 biases lock nut 80 towards backing plate 84. Due to the connection of lock nut 80 and metering end 90, pin 42 is forced through plate aperture 100 and against diaphragm 86. Pin 42 thereby forces diaphragm 86 to the primed position.

To fire lubricant injector 20, lubricant is provided to pressure chamber 60 through lubrication line 18 and lubricant inlet 38. As lubricant is supplied to pressure chamber 60 the lubricant pressure builds within pressure chamber 60 until the lubricant pressure reaches the level required to fire lubricant injector 20. The lubricant pressure acts on a lower side of piston head 76 until the pressure is sufficient to overcome the force of injector spring 72 and force piston 70 upward. When the lubricant pressure reaches the required level, the lubricant pressure causes piston 70 to shift from the position shown in FIG. 3A to the position shown in FIG. 3B, which causes a metered amount of lubricant to be forced from lubricant chamber 66 through check valve 56 and to supply line 22.

In FIG. 3B, lubricant injector 20 is shown in a activated state where lubricant has been dispensed from lubricant injector 20, and a set volume of lubricant is metered for the next lubrication cycle. Piston head 76 is forced upward through lubricant chamber 66 by the lubricant pressure within pressure chamber 60. Piston head 76 drives lubricant out of lubricant chamber 66, through check valve 56, and to supply line 22. The lubricant proceeds through supply line 22 and to the lubricated machinery. As piston 70 shifts upwards, retaining clip 74 is pulled upwards through a connection between piston 70 and retaining clip 74. Injector spring 72 is thus compressed between body 34 and retaining clip 74.

Piston 70 shifting from the primed position to the activated position causes piston head 76 to be disposed above flow path 62. As such, flow path 62 is in fluid communication with pressure chamber 60. The lubricant flows from pressure chamber 60 and to metering chamber 64 past piston 70. A diameter of shaft 78 is smaller than a diameter of piston head 76, thereby opening a fluid connection between pressure chamber 60 and metering chamber 64 when piston head 76 is disposed above flow path 62.

The pressure required to overcome the downward force exerted by injector spring 72 is also sufficient to overcome the force exerted by metering spring 82, which biases lock nut 80, and thus pin 42 and diaphragm 86, towards the position shown in FIG. 3A. As such, the lubricant flowing to metering chamber 64 actuates diaphragm 86 from the primed position (shown in FIG. 3A) to the activated position (shown in FIG. 3B). Diaphragm 86 pushes pin 42, and thus lock nut 80, to the position shown in FIG. 3B. Lock nut 80 compresses metering spring 82 between lock nut 80 and end wall 48.

Pin 42 is displaced by diaphragm 86 until shoulder 94 encounters an interior side of end wall 48. As pin 42 shifts to the activated position, lock nut 80 simultaneously shifts due to the connection of lock nut 80 and metering end 90. Lock nut 80 slides within second end 88 of retaining member 40 until shoulder 94 encounters an inner side of end wall 48. Lock nut 80 compresses metering spring 82 between lock nut 80 and end wall 48. Indicating end 52 of pin 42 extends through aperture 50 and provides a visual indication that lubricant injector 20 has fired. Shoulder 94 defines a limit of the stroke of pin 42 by abutting an inner side of end wall 48 to stop the displacement of both pin 42 and diaphragm 86.

As diaphragm 86 is displaced, diaphragm 86 flexes in response to the lubricant pressure to measure the set volume of lubricant for the next lubrication cycle. Diaphragm 86 conforms to contour 102 on second side 98 of backing plate 84. Sealing ring 104 remains within annular recess 68 to maintain a static seal between the lubricant and metering portion 32. Metering end 90 of pin 42 is tightly toleranced to plate aperture 100 to prevent diaphragm 86 from extruding around pin 42 and rupturing. The pressurized lubricant forces diaphragm into the activated position, thereby expanding metering chamber 64 between diaphragm 86 and flow path 62. Lubricant flows to metering chamber 64 and fills metering chamber 64 with a set volume of lubricant.

After lubricant injector 20 has dispensed lubricant, lubrication line 18 is vented, thereby decreasing the lubricant pressure within pressure chamber 60. The drop in lubricant pressure allows firing mechanism 58 to enter a return stroke where firing mechanism 58 transitions from the activated position, shown in FIG. 3B, to the primed position, shown in FIG. 3A. The lubricant pressure drops below that required to maintain firing mechanism 58 in the activated position, and injector spring 72 forces retaining clip 74 downward thereby drawing piston 70 back to the primed position due to the connection of retaining clip 74 and piston 70. Piston head 76 is pulled through lubricant chamber 66. As piston head 76 returns to the primed position, the tight tolerance between piston head 76 and lubricant chamber 66 causes check valve 56 to close and creates a void between check valve 56 and piston head 76. The negative pressure of the void allows metering spring 82 to return to the primed position.

Metering spring 82 forces lock nut 80, and thus pin 42, back towards the primed position, due to the pressure within lubricant chamber 66 being less than the force exerted by metering spring 82. As metering spring 82 drives lock nut 80 and pin 42 back to the primed position, pin 42 forces diaphragm 86 into metering chamber 64, thereby reducing the volume of metering chamber 64 and driving the lubricant out of metering chamber 64. The lubricant flows through flow path 62 and to lubricant chamber 66. Lubricant chamber 66 is thus loaded for the next lubrication cycle.

Lock nut 80 defines the stroke length of pin 42, thereby determining the volume of lubricant metered for each lubrication cycle. The stroke length may be adjusted by rotating pin 42, thereby causing lock nut 80 to slide along a length of pin 42. Lock nut 80 moves along the length of pin 42 as lock nut 80 is non-rotatable relative to second end 88 but preferably has a threaded connection with pin 42. For example, pin 42 may be rotated such that lock nut 80 is adjacent backing plate 84 when shoulder 94 is adjacent end wall 48. Lubricant injector 20 will thus have zero output as pin 42 cannot shift due to shoulder 94 abutting end wall 48 and lock nut 80 abutting backing plate 84. As such, pin 42 would neither shift due to lubricant entering metering chamber 64 nor shift to push diaphragm 86 into metering chamber 64. Thus, lubricant chamber 66 would not be loaded with lubricant from metering chamber 64 for any subsequent lubrication cycle. Conversely, lubricant injector 20 is configured for maximum output (as shown in FIGS. 3A and 3B) when pin 42 pushes diaphragm 86 fully within metering chamber 64, such that the full volume of lubricant is discharged from metering chamber 64 to prime lubricant injector 20. A position of lock nut 80 on pin 42 may be adjusted to any suitable position to provide any desired output between maximum output and zero output, and the output may be adjusted by rotating pin 42.

Figure 4:
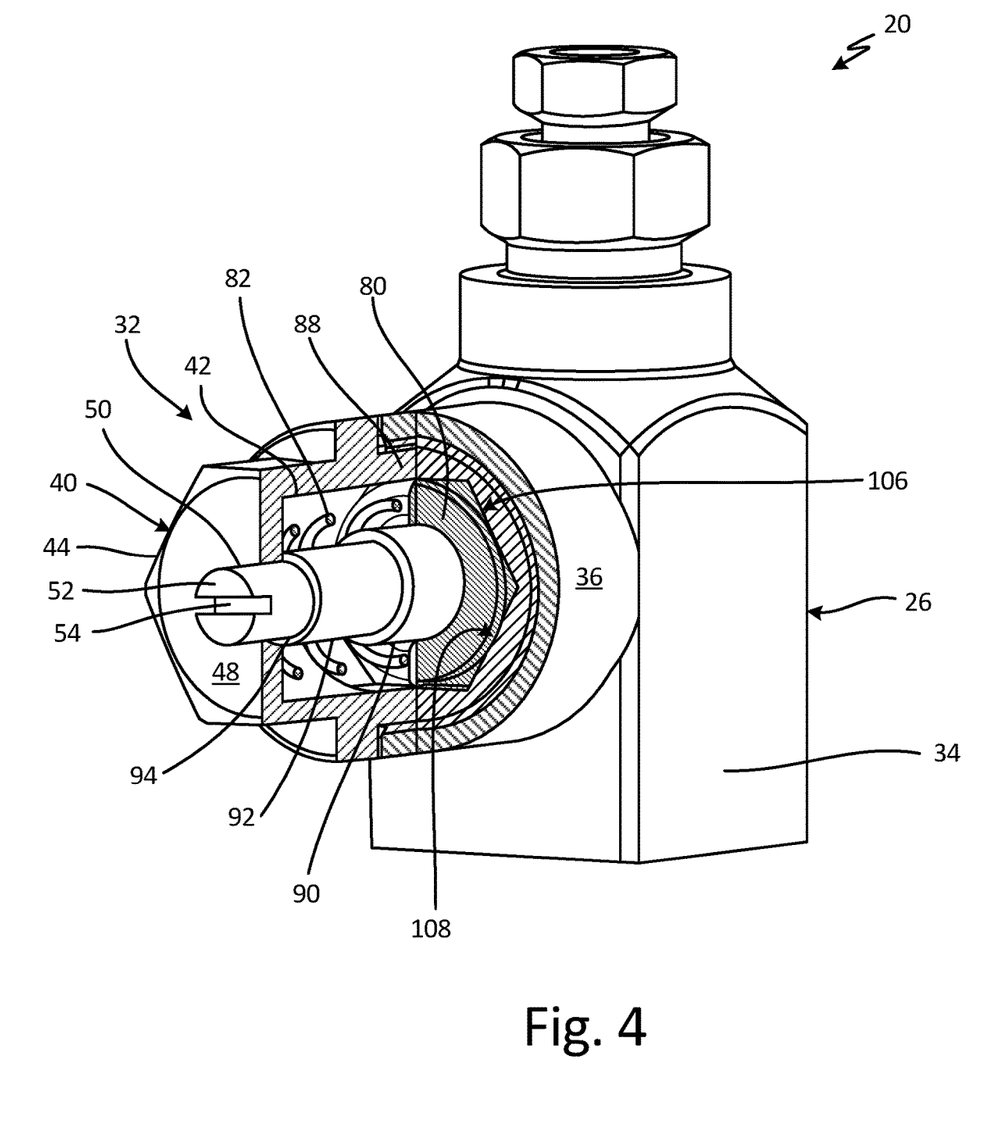
FIG. 4 is a partial cut-away view of a lubricant injector with a portion of the injector removed.

FIG. 4 is a partial cut-away view of lubricant injector 20. Lubricant injector 20 includes housing 26 and metering portion 32. Housing 26 includes body 34 and metering cylinder 36. Metering portion 32 includes retaining member 40, pin 42, lock nut 80, and metering spring 82. Retaining member 40 includes first end 44, flange 46, and second end 88. First end 44 includes end wall 48 and aperture 50. Second end 88 includes inner contour 106. Pin 42 includes indicating end 52, metering end 90, pin body 92, and shoulder 94. Indicating end 52 includes adjustment slot 54. Lock nut 80 includes outer contour 108.

Retaining member 40 is connected to housing 26. Second end 88 is disposed within and engages metering cylinder 36. An outer diameter of second end 88 preferably includes external threading that engages with internal threading of metering cylinder 36 to secure retaining member 40 to housing 26. It is understood, however, that retaining member 40 may be connected to metering cylinder 36 in any suitable manner, such as through a snap fit or a press fit. Flange 46 abuts an end of metering cylinder 36. Flange abutting an end of metering cylinder 36 indicates that retaining member 40 is fully installed and prevents overtightening of retaining member 40 within metering cylinder 36. Aperture 50 extends through end wall 48 of first end 44. Lock nut 80 is slidably disposed within second end 88 of retaining member 40. Pin 42 is disposed within retaining member 40 and extends through lock nut 80. Metering end 90 of pin 42 is attached to lock nut 80. Metering end 90 of pin 42 preferably includes external threading configured to mate with internal threading of lock nut 80. Pin body 92 extends between and connects indicating end 52 and metering end 90, and shoulder 94 is disposed at a connection of indicating end 52 and pin body 92. Indicating end 52 of pin 42 extends through aperture 50 in end wall 48 of retaining member 40. A diameter of indicating end 52 is similar to a diameter of aperture 50 such that indicating end 52 may slide through aperture 50. A diameter of pin body 92 is greater than a diameter of aperture 50 such that shoulder 94 abuts an inner side of end wall 48 when pin 42 is in an activated position. Metering spring 82 is disposed between lock nut 80 and end wall 48 and surrounds pin 42.

Outer contour 108 of lock nut 80 is configured to conform to the shape of inner contour 106 of second end 88 of retaining member 40. As shown, outer contour 108 of lock nut 80 is hexagonal and inner contour 106 of second end 88 is similarly hexagonal. Having the outer diameter of lock nut 80 conform to inner contour 106 of second end 88 allows lock nut 80 to slide along a length of second end 88 while preventing any rotation of lock nut 80 relative to second end 88. While outer contour 108 of lock nut 80 is illustrated as hexagonal to match inner contour 106 of second end 88, it is understood that outer contour 108 of lock nut 80 and inner contour 106 of second end 88 may be triangular, rectangular, or of any other suitable shape to allow lock nut 80 to slide within second end 88 while preventing the rotation of lock nut 80 relative to second end 88.

Metering end 90 of pin 42 is attached to lock nut 80. When pin 42 is driven by internal components within housing 26, pin 42 pulls lock nut 80 axially within second end 88 through the connection of metering end 90 and lock nut 80. The stroke length of pin 42 determines a volume of lubricant metered for the next lubrication cycle. Pin 42 may be rotated to adjust a stroke length of pin 42. Pin 42 may be rotated by a tool, such as a screwdriver, engaging adjustment slot 54. The rotation of pin 42 causes lock nut 80 to move along a length of metering end 90 due to the connection between lock nut 80 and metering end 90, which is preferably a threaded connection. Shifting lock nut 80 along a length of metering end 90 adjusts a stroke length of pin 42, such that when pin 42 is in the primed position shoulder 94 is either closer to end wall 48, thereby reducing the volume of lubricant dispensed during each cycle, or further from end wall 48, thereby increasing the volume of lubricant dispensed during each cycle. While adjustment slot 54 is illustrated as an elongate slot, such that a flathead screwdriver may engage adjustment slot 54, it is understood that adjustment slot 54 may take any suitable form to allow a tool to rotate pin 42, such as square, splined, or any other suitable shape. Moreover, indicating end 52 may be shaped such that indicating end 52 can be directly engaged to rotate pin 42, such as having a hexagonal portion of indicating end 52 configured to extend outside of aperture 50.

When lubricant injector 20 fires, the lubricant pressure causes pin 42 to shift within metering cylinder 36 until shoulder 94 abuts end wall 48. With lock nut 80 attached to metering end 90, lock nut 80 similarly shifts within metering cylinder 36, thereby compressing metering spring 82. The diameter of indicating end 52 of pin 42 is similar to the diameter of aperture 50, which allows indicating end 52 to freely slide through aperture 50. However, a diameter of pin body 92 is greater than the diameter of aperture 50. In this way, shoulder 94 limits the stroke of pin 42 as shoulder 94 abuts an inner face of end wall 48 when indicating end 52 extends through aperture 50. Indicating end 52 projects through aperture 50 when pin 42 has reached a maximum displacement, thereby providing a visual indication that lubricant injector 20 has distributed lubricant.

While pin 42 is described as including indicating end 52 and shoulder 94, it is understood that pin 42 may be configured to trigger an electronic indictor that transmits a signal to a user that lubricant injector 20 has fired. It is further understood that while retaining member 40 is described as including aperture 50, retaining member 40 may include a solid end wall 48, such that pin body 92 directly abuts end wall 48 when lubricant injector 20 has fired. In such a case, pin body 92 directly engaging end wall 48 may trigger the indictor to transmit a signal to the user. After lubricant injector 20 provides lubricant downstream, lubrication line 18 (shown in FIG. 1) is vented to relieve the lubricant pressure in housing 26. Relieving the lubricant pressure in housing 26 allows lubricant injector to reset. Metering spring 82 pushes lock nut 80 back to the primed position and lock nut 80 simultaneously returns pin 42 to the primed position.

Metering portion 32 provides significant advantages. Diaphragm 86 provides a static seal while still allowing pin 42 to move with the lubricant pressure and return with metering spring 82. The static seal provided by diaphragm 86 prevents leaks that may develop with a dynamic or moving seal, and thus provides an increased service life for lubricant injector 20. In addition, the connection between pin 42 and lock nut 80 allows for the output to be adjusted without loosening and tightening of an external jam nut, thereby simplifying output selection. The stroke length may be easily adjusted by engaging a tool with adjustment slot 54 to rotate pin 42. Indicating end 52 provides a visual indicator that lubricant injector 20 has fired and that lubricant injector 20 has reset to the primed position.

Although the present invention has been described with reference to preferred embodiments, workers skilled in the art will recognize that changes may be made in form and detail without departing from the spirit and scope of the invention.

The invention claimed is:

1. A lubricant injector comprising:
  a housing including a body and a metering cylinder extending from the body, the metering cylinder extending along an axis;
  an inlet cylinder attached to the body of the housing, wherein the inlet cylinder defines a pressure chamber;
  a lubricant chamber disposed within the body and connected to the pressure chamber;
  a metering chamber connected to the lubricant chamber;
  a firing mechanism disposed within the inlet cylinder and extending into the lubricant chamber, wherein the firing mechanism is movable between a first position, where the metering chamber is fluidly isolated from the pressure chamber, and a second position, where the metering chamber is fluidly connected to the pressure chamber;
  a metering portion secured to the housing, the metering portion comprising:
  a diaphragm disposed within the metering cylinder and forming a static seal about the metering chamber; and
  a retaining member having a first end and a second end, wherein the second end is attached to the metering cylinder, and wherein the retaining member secures the diaphragm within the metering cylinder;
  a pin at least partially disposed within the retaining member and configured to shift along the axis; and
  a lock nut connected to the pin and disposed within the retaining member, wherein the lock nut is connected to the pin such that the lock nut slides axially with the pin, and wherein the lock nut interfaces with the retaining member to prevent rotation of the lock nut about the axis;
  wherein a central portion of the diaphragm is configured to flex to expand the metering chamber in response to a flow of lubricant to the metering chamber when the firing mechanism is in the second position; and
  wherein a circumference of the diaphragm forms the static seal between the metering chamber and the retaining member.

2. The lubricant injector of claim 1, and further comprising:
  a spring disposed between the lock nut and the first end of the retaining member;
  wherein the pin includes an indicator end, a metering end extending from the indicator end, and a shoulder disposed at an interface between the indicator end and the metering end; and
  wherein the lock nut is attached to the metering end.

3. The lubricant injector of claim 2, wherein the indicator end includes an adjustment slot.

4. The lubricant injector of claim 1, and further comprising:
  a backing plate disposed between the retaining member and the diaphragm.

5. The lubricant injector of claim 4, wherein the diaphragm includes a sealing ring disposed about a circumference of the diaphragm.

6. The lubricant injector of claim 5, wherein the metering cylinder includes an annular recess configured to receive the sealing ring.

7. The lubricant injector of claim 1, wherein the pin includes external threads and the lock nut further includes internal threads, and wherein the external threads mesh with the internal threads.

8. The lubricant injector of claim 1, wherein an inner diameter of the second end comprises a first contour and an outer diameter of the lock nut comprises a second contour, and wherein the first contour is configured to mate with the second contour to prevent rotation of the lock nut relative to the second end.

9. The lubricant injector of claim 8, wherein the first contour comprises a hexagon.

10. The lubricant injector of claim 1, wherein the retaining member includes a flange extending radially outward from the retaining member.

11. The lubricant injector of claim 1, wherein the second end includes external threading and wherein the metering cylinder includes internal threading configured to mate with the external threading.

12. A metering portion of a lubricant injector comprising:
  a diaphragm disposed within a metering cylinder, the metering cylinder extending along an axis, the diaphragm forming a static seal to define a metering chamber, wherein a central portion of the diaphragm is configured to flex in response to a flow of lubricant to the metering chamber to expand the metering chamber and measure a volume of lubricant;
  a retaining member attached to the metering cylinder and securing the diaphragm within the metering cylinder; and
  a pin at least partially disposed within the metering cylinder, wherein a metering end of the pin abuts the diaphragm;
  a lock nut connected to the pin and disposed within the retaining member, wherein the lock nut is connected to the pin such that the lock nut slides axially with the pin, and wherein the lock nut interfaces with the retaining member to prevent rotation of the lock nut about the axis;

wherein a circumference of the diaphragm forms the static seal between the metering chamber and the retaining member.

13. The metering portion of claim 12, and further comprising:
a spring disposed within the retaining member between the lock nut and an end wall of the retaining member, wherein the spring is configured to bias the lock nut towards the diaphragm.

14. The metering portion of claim 12, wherein the metering end includes external threads and the lock nut includes internal threads, and wherein the external threads are configured to mesh with the internal threads.

15. The metering portion of claim 12, and further comprising:
a backing plate disposed within the metering cylinder between the retaining member and the diaphragm, wherein the backing plate includes a plate aperture through which the metering end extends.

16. The metering portion of claim 12, wherein the retaining member further comprises:
a first end having an end wall;
an aperture extending through the end wall; and
a second end extending from the first end and secured within the metering cylinder.

17. The metering portion of claim 16, wherein the pin further comprises:
a pin body extending from the metering end;
an indicating end extending from the pin body opposite the metering end; and
a shoulder disposed at the connection of the indicating end and the pin body;
wherein the indicating end extends through the aperture in the end wall of the retaining member.

18. The metering portion of claim 17, wherein the indicating end includes an adjustment slot.

19. The metering portion of claim 12, wherein an inner diameter of the second end includes a first contour and an outer diameter of the lock nut includes a second contour, and wherein the first contour is configured to mate with the second contour to prevent rotation of the lock nut relative to the retaining member.

20. The metering portion of claim 12, wherein the metering cylinder includes an annular recess disposed about a perimeter of the metering chamber and the diaphragm includes a sealing ring disposed about a circumference of the diaphragm, and wherein sealing ring is disposed within the annular recess.

21. A lubricant injector comprising:
a housing including a body and a metering cylinder extending from the body;
an inlet cylinder attached to the body of the housing, wherein the inlet cylinder defines a pressure chamber;
a lubricant chamber disposed within the body and connected to the pressure chamber;
a metering chamber connected to the lubricant chamber;
a firing mechanism disposed within the inlet cylinder and extending into the lubricant chamber, wherein the firing mechanism is movable between a first position, where the metering chamber is fluidly isolated from the pressure chamber, and a second position, where the metering chamber is fluidly connected to the pressure chamber;
a metering portion secured to the housing, the metering portion comprising:
a diaphragm disposed within the metering cylinder and forming a static seal about the metering chamber; and
a retaining member having a first end and a second end, wherein the second end is attached to the metering cylinder, and wherein the retaining member secures the diaphragm within the metering cylinder;
a backing plate disposed between the retaining member and the diaphragm; and
a pin at least partially disposed in the retaining member and extending through the backing plate and directly contacting a central portion of the diaphragm;
wherein the central portion of the diaphragm is configured to flex to expand the metering chamber in response to a flow of lubricant to the metering chamber when the firing mechanism is in the second position; and
wherein a circumference of the diaphragm forms the static seal between the metering chamber and the retaining member.

22. A metering portion of a lubricant injector comprising:
a diaphragm disposed within a metering cylinder and forming a static seal to define a metering chamber, wherein a central portion of the diaphragm is configured to flex in response to a flow of lubricant to the metering chamber to expand the metering chamber and measure a volume of lubricant;
a retaining member attached to the metering cylinder and securing the diaphragm within the metering cylinder;
a pin at least partially disposed within the metering cylinder, wherein a metering end of the pin abuts the diaphragm; and
a backing plate disposed between the retaining member and the diaphragm;
wherein the pin extends through the backing plate and directly contacts the diaphragm; and
wherein a circumference of the diaphragm forms the static seal between the metering chamber and the retaining member.

* * * * *